(12) United States Patent
Ma et al.

(10) Patent No.: US 7,232,854 B2
(45) Date of Patent: Jun. 19, 2007

(54) POLYCARBONATE COMPOSITIONS WITH THIN-WALL FLAME RETARDANCE

(75) Inventors: Shiping Ma, Moka (JP); Thomas Ebeling, Evansville, IN (US); Shrish Rane, Batesville, IN (US)

(73) Assignee: General Electric Company, Schenectady, NY (US)

( * ) Notice: Subject to any disclaimer, the term of this patent is extended or adjusted under 35 U.S.C. 154(b) by 290 days.

(21) Appl. No.: 10/771,589

(22) Filed: Feb. 3, 2004

(65) Prior Publication Data

US 2005/0182165 A1 Aug. 18, 2005

(51) Int. Cl.
C08K 5/523 (2006.01)
C08K 3/34 (2006.01)

(52) U.S. Cl. .................. 524/127; 524/140; 524/141; 524/145; 524/165; 524/445; 524/451; 524/456

(58) Field of Classification Search ............... 524/127, 524/140–141, 145, 165, 445, 451, 456
See application file for complete search history.

(56) References Cited

U.S. PATENT DOCUMENTS

| | | | |
|---|---|---|---|
| 3,419,634 A | 12/1968 | Vaughn, Jr. | |
| 4,269,755 A | 5/1981 | Holub et al. | |
| 4,994,510 A | 2/1991 | Naar et al. | |
| 5,091,461 A | 2/1992 | Skochdopole | |
| 5,189,091 A | 2/1993 | Laughner | |
| 5,449,710 A | 9/1995 | Umeda et al. | |
| 5,451,632 A | 9/1995 | Okamura | 524/537 |
| 5,714,537 A | 2/1998 | Laughner et al. | |
| 5,965,655 A | 10/1999 | Mordecai et al. | |
| 5,981,611 A | 11/1999 | Erickson | |
| 6,072,011 A * | 6/2000 | Hoover | 525/464 |
| 6,448,316 B1 | 9/2002 | Hirano et al. | |
| 6,576,706 B1 | 6/2003 | Nodera | 525/67 |
| 6,657,018 B1 * | 12/2003 | Hoover | 525/464 |
| 6,762,228 B2 | 7/2004 | Seidel et al. | |
| 2002/0137822 A1 | 9/2002 | Seidel et al. | |
| 2002/0193476 A1 * | 12/2002 | Mitsuta et al. | 524/115 |
| 2003/0109612 A1 | 6/2003 | Seidel et al. | |
| 2003/0181603 A1 * | 9/2003 | Venderbosch et al. | 525/461 |
| 2005/0085580 A1 * | 4/2005 | Marugan et al. | 524/431 |
| 2006/0014919 A9 * | 1/2006 | Venderbosch et al. | 528/196 |

FOREIGN PATENT DOCUMENTS

| | | |
|---|---|---|
| DE | 4016417 | 11/1991 |
| EP | 0692522 | 1/1996 |
| EP | 1 331 246 | 7/2003 |
| EP | 1471114 A1 | 10/2004 |
| JP | 4285655 | 10/1992 |
| JP | 3457805 B2 | 10/2003 |

OTHER PUBLICATIONS

PCT International Search Report for PCT/US2005/003417, international filing date Feb. 2, 2005.

* cited by examiner

Primary Examiner—Peter Szekely
(74) Attorney, Agent, or Firm—Marina Larson & Associates, LLC

(57) ABSTRACT

Polycarbonate compositions containing a specific combination of additives achieve desirable flame retardance characteristics when used in thin wall polycarbonate articles. These compositions contain a polycarbonate/siloxane component, containing a polycarbonate siloxane copolymer, or a mixture of a polycarbonate siloxane copolymer and polycarbonate resin; a mineral filler; and a flame retardant. The composition contains at least 50% by weight of polycarbonate when the polycarbonate of the polycarbonate siloxane copolymer and any polycarbonate resin (linear or branched) are considered together; and the polycarbonate siloxane copolymer and the mineral filler are present in amounts effective to achieve a flex modulus of 29,000 $kg/cm^3$ or greater, for example 30,000 $kg/cm^3$ or greater, good flex-fold strength and good impact strength, for example a room temperature Notched Izod Impact Strength of 25 kgf-cm/cm or greater. The composition also includes a flame retardant to enable the composition to obtain a UL94 rating of V0 at test thicknesses of 1.2 mm.

57 Claims, No Drawings

POLYCARBONATE COMPOSITIONS WITH THIN-WALL FLAME RETARDANCE

BACKGROUND OF THE INVENTION

This application relates to a polycarbonate composition with enhanced properties, particularly as they relate to thin wall flame retardance. This composition can be used in the formation of injection molded or extruded articles.

Polycarbonate has shown excellent adaptability for a wide variety of applications. Numerous additives are known in the art for a variety of purposes, for example to provide flame retardance, to enhance impact strength, and to enhance resistance to degradation resulting from exposure to light and/or chemicals. While each of these additives has a beneficial affect, in many cases this benefit is achieved only at the expense of some other property. Thus, for any given application, careful selection of additives is necessary to achieve the properties needed for that application.

Flame retardance in polycarbonate articles reflects both the burn time of the composition when ignited, and the tendency of the composition to drip molten plastic which can ignite nearby materials. Flame retardance is a function of both the composition of the material and the wall thickness of the article into which the material is formed. Thus, flame retardance is frequently assessed using the rating system of UL94 test in which results are presented in terms of a rating, for example V0, achieved at a given thickness of test material. Several different material thicknesses can be used in the test, and it will be appreciated that where a V0 rating is achieved at one thickness this rating would also be attained if thicker test pieces were used. Materials which increase fire resistance or flame retardance, however, frequently degrade other properties of the composition, including strength properties. This can be a particular challenge where the application requires thin wall structures which are harder to attain flame retardance for in the first place, and which are more susceptible to failure as a result of mechanical strength. Thus, specific compositions with good flame retardance even in thin wall structures which retain mechanical strength are desirable.

SUMMARY OF THE INVENTION

The present invention provides polycarbonate compositions containing a specific combination of additives which achieve desirable flame retardance characteristics when used in thin wall polycarbonate articles. These compositions comprise:
(a) a polycarbonate/siloxane component, said polycarbonate/siloxane component being a polycarbonate siloxane copolymer, or a mixture of a polycarbonate siloxane copolymer and polycarbonate resin;
(b) a mineral filler; and
(c) a flame retardant.

The composition comprises at least 50% by weight of polycarbonate when the polycarbonate of the polycarbonate siloxane copolymer and any polycarbonate resin (linear or branched) are considered together; and the polycarbonate siloxane copolymer and the mineral filler are present in amounts effective to achieve a flex modulus of 29,000 kgf/cm$^3$ or greater, for example 30,000 kgf/cm$^3$ or greater, good flex-fold strength and good impact strength, for example a room temperature Notched Izod Impact Strength of 25 kgf-cm/cm or greater, for example 30 kgf-cm/cm or greater. The composition also includes a flame retardant to enable the composition to obtain a UL94 rating of V0 at test thicknesses of 1.2 mm. The invention further provides thin wall articles made from this composition, and a method for making such articles.

DETAILED DESCRIPTION OF THE INVENTION

The present invention provides polycarbonate compositions containing a specific combination of additives which achieve desirable characteristics in terms of flexural modulus, thin wall fire retardance and impact strength.

As used in the specification and claims of this application, the term "thin wall fire retardance" refers to fire retardance in articles having wall thickness of less than 2.0 mm, when made by injection molding, more preferably less than 1.5 mm, and of less than 2.5 mm when made by extrusion, more preferably of less than 2 mm. It will be appreciated that injection molded and extruded articles may not have a constant wall thickness, and that the flame resistance of the article will depend on the thin portions of the article wall. Thus, when an article is described as a "thin wall article" this means that some portion, but not necessarily all of the article has walls that are as described above.

Numerical values in the specification and claims of this application, particularly as they relate to polymer compositions, reflect average values for a composition that may contain individual polymers of different characteristics. Furthermore, the numerical values should be understood to include numerical values which are the same when reduced to the same number of significant figures and numerical values which differ from the stated value by less than the experimental error of conventional measurement technique of the type described in the present application to determine the value.

When the specification and claims refer to compositions that obtain a UL94 V0 rating at 1.2 mm this refers to the minimum level of fire retardance and does not indicate or imply that better fire retardance, for example V0 at 1.0 mm, or at 0.8 mm as in many of the examples may not be obtainable within the scope of the claims.

The composition of the invention comprises a polycarbonate/siloxane component, a mineral filler, and a flame retardant. The composition may further comprise additional resin components, as well as additional additives. The polycarbonate in the polycarbonate/siloxane component makes up at least 50% by weight of the composition of the invention, for example at least 60% or at least 65% by weight of the composition. In preferred embodiments of the invention, the composition of the invention comprises 5–30% by weight of the total composition of the polycarbonate-siloxane copolymer, for example 10–20%, 0.1 to 10% by weight of the total composition of the flame retardant, for example 0.5 to 5%, and 1–20% by weight of the total composition of the mineral filler, for example 5–15%.

As reflected in Table 1, the combination of ingredients achieves a desirable balance of properties, and specifically flexural modulus of 29,000 kg/cm$^2$ or greater, for example 34,000–36,000 kg/cm2, a UL94 V0 rating at test thicknesses of 1.2 mm, and a notched IZOD impact of 25 kgf-cm/cm or greater. In contrast, the comparative examples, in which one of the components is omitted, suffer from reduced performance in one or more of these properties. Thus, the composition as claimed represents an improved combination of ingredients to produce the specific desired results.

The polycarbonate/siloxane component in the compositions of the invention may be a polycarbonate siloxane copolymer, or a mixture of a polycarbonate siloxane copolymer and polycarbonate resin In some embodiments in order to obtain levels of polycarbonate of at least 50% by weight and the appropriate level of siloxane. It will be appreciated that where the proportional amount of siloxane in the polycarbonate siloxane copolymer is low, one can achieve both the desired levels of polycarbonate and siloxane with very little or even no added polycarbonate resin. On the other hand, where the proportional amount of siloxane is high, it will be appropriate to include polycarbonate resin in the composition. In specific embodiments, the siloxane in the polycarbonate/siloxane components is suitably present in an amount of from 0.5 to 6% by weight of the total composition.

When present, the polycarbonate/siloxane component of the present invention comprises a polycarbonate resin. There are numerous polycarbonate resin formulations known, and the polycarbonate resin in the composition may be selected to achieve addition properties desired for a given application. Thus, the polycarbonate resin may be a high heat polycarbonate, or a polycarbonate selected to have good flow properties consistent with use in molding applications or extrusion.

The polycarbonate may be one made by either an interfacial process or a melt transesterification process. In the most common embodiment of the interfacial process, bisphenol A (BPA) and phosgene are reacted to form polycarbonate. When a melt transesterification process is used, polycarbonate is made by reacting a diaryl carbonate and a dihydric phenol. The techniques for performing melt transesterification reactions are well known, and are, for example, described in Organic Polymer Chemistry by K. J. Saunders, 1973, Chapman and Hall Ltd., as well as in a number of U.S. patents, including U.S. Pat. Nos. 3,442,854; 5,026,817; 5,097,002; 5,142,018; 5,151,491; and 5,340,905. As is known in the art, there are numerous diaryl carbonates and dihydric phenols which may be employed. The specific diaryl carbonate and the specific dihydric phenol selected will depend on the nature of the desired polycarbonate. Common diaryl carbonates which may be employed include but are not limited to diphenyl carbonate, ditolyl carbonate, bis(chlorophenyl)carbonate; m-cresyl carbonate; dinaphthyl carbonate; bis(diphenyl)carbonate; diethyl carbonate; dimethyl carbonate; dibutyl carbonate; and dicyclohexyl carbonate. Common dihydric phenols include but are not limited to bis(hydroxyaryl)alkanes such as bis(4-hydroxyphenyl)methane; 1,1-bis(4-hydroxyphenyl)ethane; 2,2-bis(4-hydroxyphenyl)propane (also known as bisphenol A); 2,2-bis(4-hydroxyphenyl)butane; 2,2-bis(4-hydroxyphenyl)octane; bis(4-hydroxyphenyl)phenylmethane; 2,2-bis(4-hydroxy-1-methylphenyl)propane; 1,1-bis(4-hydroxy-t-butylphenyl)propane; and 2,2-bis(4-hydroxy-3-bromophenyl)propane; bis(hydroxyaryl)cycloalkanes such as 1,1-(4-hydroxyphenyl)cyclopentane and 1,1-bis(4-hydroxyphenyl)cyclohexane; dihydroxyaryl ethers such as 4,4'-dihydroxydiphenyl ether and 4,4'dihydroxy-3,3'-dimethylphenyl ether; dihydroxydiaryl sulfides such as 4,4'-dihydroxydiphenyl sulfide and 4,4'-dihydroxy-3,3'-dimethyldiphenyl sulfide; dihydroxydiaryl sulfoxides such as 4,4'-dihydroxydiphenyl sulfoxide and 4,4'-dihydroxy-3,3'-dimethyldiphenyl sulfoxide; and dihydroxydiaryl sulfones such as 4,4'-dihydroxydiphenyl sulfone and 4,4'-dihydroxy-3,3'-dimethyldiphenyl sulfone. In one common for of polycarbonate, the aromatic dihydroxy compound is bisphenol A (BPA) and the diaryl carbonate is diphenyl carbonate.

The polycarbonate resins used in the invention comprise repeating structural units of the formula (I):

in which at least about 60 percent of the total number of $R^1$ groups are aromatic organic radicals and the balance thereof are aliphatic, alicyclic, or aromatic radicals. Preferably, $R^1$ is an aromatic organic radical and, more preferably, a radical of the formula (II):

wherein each of $A^1$ and $A^2$ is a monocyclic divalent aryl radical and $Y^1$ is a bridging radical having one or two atoms which separate $A^1$ from $A^2$. In an exemplary embodiment, one atom separates $A^1$ from $A^2$. Illustrative non-limiting examples of radicals of this type are —O—, —S—, —S(O)—, —S(O)$_2$—, —C(O)—, methylene, cyclohexylmethylene, 2-[2.2.1]-bicycloheptylidene, ethylidene, isopropylidene, neopentylidene, cyclohexylidene, cyclopentadecylidene, cyclododecylidene, and adamantylidene. The bridging radical $Y^1$ can be a hydrocarbon group or a saturated hydrocarbon group such as methylene, cyclohexylidene or isopropylidene.

Preferred polycarbonates are based on bisphenol A, in which each of $A^1$ and $A^2$ is p-phenylene and $Y^1$ is isopropylidene. Preferably, the average molecular weight of the polycarbonate is in the ranges from about 5,000 to about 100,000, more preferably in the range from about 10,000 to about 65,000, and most preferably in the range from about 15,000 to about 35,000. When present, the polycarbonate resin is employed in amounts of about 1 to about 99 weight percent, based on the total weight of the composition. Preferably the polycarbonate resin is present in an amount of about 1 to about 95, more preferably about 5 to about 90 and most preferably about 5 to about 85, based on the total weight of the composition.

In addition to linear homo-polycarbonates, the polycarbonate resin may include hetero-polycarbonate species including two or more different dihydric phenols or a copolymer of a dihydric phenol with a glycol or with a hydroxy- or acid-terminated polyester or with a dibasic acid or hydroxy acid. Polyarylates and polyester-carbonate resins or their blends can also be employed. Branched polycarbonates are also useful, as well as blends of linear polycarbonate and a branched polycarbonate. The branched polycarbonates may be prepared by adding a branching agent during polymerization. These branching agents are well known and may comprise polyfunctional organic compounds containing at least three functional groups which may be hydroxyl, carboxyl, carboxylic anhydride, haloformyl and mixtures thereof. Specific examples include trimellitic acid, trimellitic anhydride, trimellitic trichloride, tris-p-hydroxy phenyl ethane, isatin-bis-phenol, tris-phenol TC (1,3,5-tris((p-hydroxyphenyl)-isopropyl)benzene), tris-phenol PA (4(4(1,1-bis(p-hydroxyphenyl)-ethyl) alpha,alpha-dimethyl benzyl) phenol), 4-chloroformyl phthalic anhydride, trimesic acid and benzophenone tetracarboxylic acid. The branching agents may be added at a level of about 0.05–2.0 weight percent. Branching agents and procedures for making branched polycarbonates are described in U.S. Pat. Nos. 3,635,895 and 4,001,184 which are incorporated by reference. All types of polycarbonate end groups are contemplated as being useful in the polycarbonate composition.

The polycarbonate resin in the polycarbonate/siloxane component may also be a blend of several polycarbonate polymers of differing characterisitcs selected to achieve desired final product conditions. For example, the polycarbonate may be a blend of homo- or hertero-polycarbonates of different molecular weights to achieve a target molecular weight. (See U.S. Pat. No. 6,441,068, which is incorporated herein by reference).

The composition may further contain an additional thermoplastic resin that is not a polycarbonate in an amount up to 45% by weight of the total composition. Non-limiting examples of thermoplastic resins that may be included in the composition of the invention include (a) polymers including as structural components aromatic vinyl monomers, (b) polymers including as structural components aromatic vinyl monomers and a vinyl cyanide monomers; (c) polymers including as structural component an aromatic vinyl monomers, a vinyl cyanide monomers and a rubber like polymer; (d) aromatic polyesters, (e) polyphenylene ethers, (f) polyether imides and (g) polyphenylene sulfides. Specific examples of such additional thermoplastic resins are styrene acrylonitrile copolymers and polymethyl(methacrylate). Rubber-like polymers may be any of several different types rubbery modifiers, including without limitations graft or core shell rubbers or combinations of two or more of these modifiers. Suitable are the groups of modifiers known as acrylic rubbers, ASA rubbers, diene rubbers, organosiloxane rubbers, EPDM rubbers, styrene-butadiene-styrene (SBS) or styrene-ethylene-butadiene-styrene (SEBS) rubbers, ABS rubbers (made by either the emulsion or bulk process, or a mixture thereof), MBS rubbers, silicone-containing core/shell impact modifiers such as Metabine S2001 from Mitsubishi Rayon, and glycidyl ester impact modifiers.

The composition may also include an anti-drip agent such as a fluoropolymer. The fluoropolymer may be a fibril forming or non-fibril forming fluoropolymer. Preferably the fluoropolymer is a fibril forming polymer. In some embodiments polytetrafluoroethylene is the preferred fluoropolymer. In some embodiments it is preferred to employ an encapsulated fluoropolymer i.e. a fluoropolymer encapsulated in a polymer as the anti-drip agent. An encapsulated fluoropolymer can be made by polymerizing the polymer in the presence of the fluoropolymer. Alternatively, the fluoropolymer can be pre-blended in some manner with a second polymer, such as for, example, an aromatic polycarbonate resin or a styrene-acrylonitrile resin as in, for example, U.S. Pat. Nos. 5,521,230 and 4,579,906 to form an agglomerated material for use as an anti-drip agent. Either method can be used to produce an encapsulated fluoropolymer.

The fluoropolymer in the encapsulated fluoropolymer comprises a fluoropolymer with a melting point of greater than or equal to about 320° C., such as polytetrafluoroethylene. A preferred encapsulated fluoropolymer is a styreneacrylonitrile copolymer encapsulated polytetrafluoroethylene (i.e., TSAN). TSAN can be made by copolymerizing styrene and acrylonitrile in the presence of an aqueous dispersion of polytetrafluoroethylene (PTFE). TSAN can, for example, comprise about 50 wt % PTFE and about 50 wt % styrene-acrylonitrile copolymer, based on the total weight of the encapsulated fluoropolymer. The styrene-acrylonitrile copolymer can, for example, be about 75 wt % styrene and about 25 wt % acrylonitrile based on the total weight of the copolymer. TSAN offers significant advantages over polytetrafluoroethylene, namely TSAN is more readily dispersed in the composition.

When present, the anti-drip agent is present in an amount effective to reduce the potential for dripping, for example in an amount of from 0.1 to 1.4% by weight, more commonly 0.5 to 1% by weight.

The composition of the invention may also include other optional components of the type commonly employed in polycarbonate compositions. Such components include without limitations antioxidants, UV stabilizers, mold release agents, reinforcing agents such as glass fibers, and antistats.

The composition of the invention also contains an effective flame-retarding amount of a flame retardant. The flame retardant may comprise a phosphate based flame retardant or a sulfonate salt flame retardant. When the composition comprises flammable components such as alkylaromatic copolymers it is preferable for the flame retardant to comprise an organic phosphate flame retardant. An organic phosphate flame retardant is suitably an aromatic phosphate compound of the formula (IIIa):

(IIIa)

where $R^7$ is the same or different and is alkyl, cycloalkyl, aryl, alkyl substituted aryl, halogen substituted aryl, aryl substituted alkyl, halogen, or a combination of any of the foregoing, provided at least one $R^7$ is aryl.

Suitable phosphate flame retardants include phosphoric ester of the formula. (IIIb):

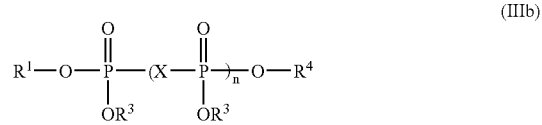

(IIIb)

In the formula IIIb, $R^1$, $R^2$, $R^3$, and $R^4$ are each independently a hydrocarbon group with 1 to 30 carbon atoms, and preferably 1 to 5, and preferably a substituted or unsubstituted aromatic hydrocarbon group. If it is substituted, examples of substituents include alkyl groups, alkoxy groups, alkylthio groups, halogens, aryl groups, and aryloxy groups.

Examples of $R^1$, $R^2$, $R^3$, and $R^4$ here include a phenyl group, cresyl group, xylenyl group (such as a 2,6-xylenyl group), trimethylphenyl group, ethylphenyl group, cumyl group, and butylphenyl group. If a hydrocarbon group is thus contained, the resulting resin composition will have particularly outstanding flame retardancy.

X is a $C_1$ to $C_{30}$ divalent organic group that may contain an oxygen atom and/or a nitrogen atom. This X is, for instance, —O—$Y^1$—O— (where $Y^1$ is a substituted or unsubstituted aromatic hydrocarbon group, and preferably a 1,4-phenylene group, 1,3-phenylene group, etc.) or —O—$Y^2$—$R^5$—$Y^3$—O— (where $Y^2$ and $Y^3$ are divalent substituted or unsubstituted aromatic hydrocarbon groups, specific examples of which include substituted or unsubstituted phenylene groups; and $R^5$ is a $C_1$ to $C_8$ divalent hydrocarbon group or an oxy hydrocarbon group (—$R^6$—O—; where $R^6$ is a $C_1$ to $C_8$ divalent hydrocarbon group), and more specifically is a $C_1$ to $C_9$ divalent, aliphatic hydrocarbon group, such as a 2,2'-propylene group). X may be an organic group in which a nitrogen atom is bonded directly to a phosphorus atom, an example of which is a 1,4-piperadinyl group (following formula).

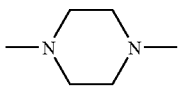

m is an integer from 0 to 5.

Favorable phosphoric esters include bisphenol A tetraphenyl diphosphate (BPADP), triphenyl phosphate, tricresyl phosphate, cresyldiphenyl phosphate, bisphenol A tetracresyl diphosphate, resorcinol tetrakis(2,6-dimethylphenyl) phosphate, and tetraxylylpiperidine phosphoramide. Of these, bisphenol A tetraphenyl diphosphate (BPADP) and bisphenol A tetracresyl diphosphate are preferable as the phosphoric ester.

Other fire retardant that can be used are those such as bisphenol A bis(diphenyl phosphate) which is described in U.S. Pat. No. 6,566,428 which is incorporated herein by reference.

The flame retardant materials may also be a sulfonate salt such as Rimar salt (potassium perfluorobutane sulfonate) and potassium diphenylsulfone sulfonate. See also the perfluoroalkane sulfonates described in U.S. Pat. No. 3,775,367, which is incorporated herein by reference.

The flame retardant is present in the compositions of the invention in an amount effective to provide the composition with a UL94 V0 rating at thicknesses of 1.2 mm. In specific embodiments, the flame retardant is present in amounts of 0.1 to 10% by weight of the total composition, for example 0.5 to 5%.

Siloxane-polycarbonate block copolymers have been recognized for their low temperature ductility and flame retardancy and may also be utilized as the matrix for incorporating the phosphorescent pigments. These block copolymers can be made by introducing phosgene under interfacial reaction conditions into a mixture of a dihydric phenol, such as BPA, and a hydroxyaryl-terminated polydiorganosiloxane. The polymerization of the reactants can be facilitated by use of a tertiary amine catalyst.

Polycarbonate-siloxane copolymers useful in the composition of the invention are known, for example from U.S. Pat. Nos. 4,746,701, 4,994,532, 5,455,310 and 6,252,013, which are incorporated herein by reference, and are sold commercially under the name LEXAN ST by General Electric Company. Mitsubishi Engineering Plastics has described a polycarbonate type resin composition that comprises (A) 100 parts weight (pts. wt.) polycarbonate type resin which consists of (a) 1–99 wt. % of polycarbonate resin, and (b) 99–1 wt. % polycarbonate-organopolysiloxane copolymer; (B) 0.1–5 pts. wt. of phosphate type compound; and (C) 0.2–2 pts. wt. of fibril-forming polytetrafluoroethylene in JP 10007897. The polycarbonate-polysiloxane copolymer from this disclosure may also be used in the present invention.

In general, the polycarbonate-siloxane copolymers useful in the invention are formed from polycarbonate blocks and poly(diorganosiloxane) blocks. The polycarbonate blocks comprise repeating structural units of the formula (I) in which at least about 60 percent of the total number of R1 groups are aromatic organic radicals and the balance thereof are aliphatic, alicyclic, or aromatic radicals. Preferably, R1 is an aromatic organic radical and, more preferably, a radical of the formula (II) wherein each of A1 and A2 is a monocyclic divalent aryl radical and Y1 is a bridging radical having one or two atoms which separate A1 from A2. In an exemplary embodiment, one atom separates A1 from A2. Illustrative non-limiting examples of radicals of this type are —O—, —S—, —S(O)—, —S(O)2—, —C(O)—, methylene, cyclohexyl-methylene, 2-[2.2.1]-bicycloheptylidene, ethylidene, isopropylidene, neopentylidene, cyclohexylidene, cyclopentadecylidene, cyclododecylidene, and adamantylidene. The bridging radical Y1 can be a hydrocarbon group or a saturated hydrocarbon group such as methylene, cyclohexylidene or isopropylidene.

The poly(diorganosiloxane) blocks comprise repeating structural units of the formula (IV)

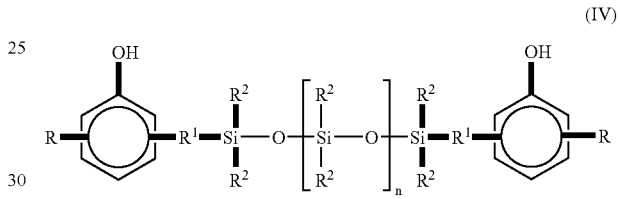

(IV)

wherein each occurrence of R2 may be the same or different and is selected from C(1–13) monovalent organic radicals, and n is an integer greater than or equal to 1, preferably greater than or equal to about 10, more preferably greater than or equal to about 25 and most preferably greater than or equal to about 40. It is desirable to have n be an integer less then or equal to about 1000, preferably less than or equal to about 100, more preferably less than or equal to about 75 and most preferably less than or equal to about 60. As is readily understood by one of ordinary skill in the art, n represents an average value.

In a preferred embodiment, the poly(diorganosiloxane) blocks comprise repeating structural units of the formula (V):

(V)

where each R may be the same or different and is selected from the group of radicals consisting of hydrogen, halogen, C(1–8) alkoxy, C(1–8) alkyl and C(6–13) aryl, R1 is a C(2–8) divalent aliphatic radical, R2 is selected from the same or different C(1–13) monovalent organic radicals, and n is an integer greater than or equal to 1, preferably greater than or equal to about 10, more preferably greater than or equal to about 25 and most preferably greater than or equal to about 40. It is also preferred to have n be an integer less then or equal to 1000, preferably less than or equal to 100, more preferably less than or equal to about 75 and most preferably less than or equal to about 60. In one embodiment n is less than or equal to 50. Particularly preferred hydroxyaryl-terminated polydiorganosiloxanes are those where R2 is methyl and R is hydrogen or methoxy and located in the ortho position to the phenolic substituent and where R1 is propyl and located ortho or para to the phenolic substituent.

Some of the radicals included within R in the above formula are halogen radicals, such as bromo, and chloro; alkyl radicals such as methyl, ethyl, and propyl; alkoxy radicals such as methoxy, ethoxy, and propoxy; aryl radicals such as phenyl, chlorophenyl, and tolyl. Radicals included within R3 are, for example, dimethylene, trimethylene and tetramethylene. Radicals included within R4 are, for example, C(1–8) alkyl radicals, haloalkyl radicals such as trifluoropropyl and cyanoalkyl radicals; aryl radicals such as phenyl, chlorophenyl and tolyl. R4 is preferably methyl, or a mixture of methyl and trifluoropropyl, or a mixture of methyl and phenyl.

The siloxane-polycarbonate block copolymers have a weight-average molecular weight (Mw, measured, for example, by Gel Permeation Chromatography, ultra-centrifugation, or light scattering) of greater than or equal to about 10,000, preferably greater than or equal to about 20,000. Also preferred is a weight average molecular weight of less than or equal to about 200,000, preferably less than or equal to about 100,000. It is generally desirable to have the polyorganosiloxane units contribute about 0.5 to about 80 wt % of the total weight of the siloxane-polycarbonate copolymer. The chain length of the siloxane blocks corresponds to about 10 to about 100 chemically bound organosiloxane units. They can be prepared such as described in for example U.S. Pat. No. 5,530,083, incorporated herein by reference in its entirety.

In the examples below, the polycarbonate-siloxane copolymer is LEXAN ST (General Electric) which is a polycarbonate/polydimethylsiloxane (PC/PDMS) copolymer having 20% weight percent siloxane content based on the total weight of the copolymer and a block length of 50 units of the poly(diorganosiloxane) (n in formulas IV and V).

The compositions of the invention also contains a mineral filler. Specific examples of suitable mineral fillers include, without limitation clay, talc, wollastonite, and combinations thereof. The mineral filler is suitably present in an amount of 1–20% by weight of the total composition, for example 5–15%.

The compositions of the invention are suitably used for making thin-walled injection molded or extruded articles. Thus, the invention also provides a method for forming a thin walled article comprising the steps of:

preparing a composition comprising:
 (a) a polycarbonate/siloxane component, said polycarbonate/siloxane component being a polycarbonate siloxane copolymer, or a mixture of a polycarbonate siloxane copolymer and polycarbonate resin;
 (b) a mineral filler, and
 (c) a flame retardant selected from among phosphate based flame retardants and sulfonate salt flame retardants;

composition comprises at least 50% by weight of polycarbonate when the polycarbonate of the polycarbonate siloxane copolymer and any polycarbonate resin (linear or branched) are considered together; and wherein the amounts of polycarbonate siloxane copolymer, mineral filler and flame retardant are effective to provide a composition with a UL94 V0 rating at a thickness of 1.2 mm, a notched Izod impact strength or of 25 k-cm/cm or greater and a flexural modulus of 29,000 kg/cm$^2$ or greater; and forming the composition into a thin-walled article by injection molding or extrusion.

The invention will now be described with reference to the following, non-limiting example.

EXAMPLE

Composition were prepared as outlined in Table 1 from

PC 1 LEXAN 145 (General Electric Co.)—linear polycarbonate with a melt index of 12.3 g/10 min at 300° C./1.2 kg loading.

PC 2 LEXAN 6739 branched polycarbonate

PC-PDMS LEXAN ST (General Electric) which is a polycarbonate/polydimethylsiloxane (PC/PDMS) copolymer having 20% weight percent siloxane content based on the total weight of the copolymer and a block length of 50 units of the poly(diorganosiloxane) (n in formulas IV and V)

Clay Composition: SiO2AL2O3. Any type of clay in market place can be used. Desirable diameter are between 1–50 micron. 1–15 micron is most desirable. Huber Clay HG90 used as an example.

Talc Composition: SiOMgO. Any type of commercialized talc can be used. Desirable diameter: 1–50 micron, 1–15 micron are most desirable. Hayashi chemical HST05 used as an example.

Wollastonite Composition: CaOSiO2, in a fiber shape with length of 2 to 1000 μm (Micron), for exp, 3–500 μm, or 5–200. Diameter between 1–50 micron are desirable. 1 to 15 micron for example. Desirable L/D=1–1000 or greater. Nyco Nyglos 4 used as an example.

ABS ABS named C29449 (General Electric) with rubber content of 16%.

PTFE Polytetrafluoroethylene. Daikin chemical Polyfuron D-2C. PTFE water dispersion.

BPADP bis-phenol A tetraphenyl diphosphate (CR741S from Diahachi Chemicals)

The compositions polycarbonate pellets of bisphenol-A polycarbonate made by a and branched polycarbonate, where applicable, were compounded with the remaining ingredients on a Werner & Pfleiderer co-rotating twin screw extruder (25 millimeter screw) and subsequently molded according to ISO294 on a ENGEL injection molding machine, using Axxicon ISO Manufactured (AIM) Mould system for producing the UL bars specimens. Where wollastonite was included in the composition, it was added in a separate downstream addition.

Tests were performed on the compositions according to the following protocols:

| | |
|---|---|
| Flexural modulus | ASTM D790 |
| Notched Izod | ASTM D256 tests performed at room temperature |
| UL94 burn time and rating | determined in accordance with UL94 standard test protocols using bars of the indicated thicknesses. |
| Heat Deflection Temperature (HDT) | ASTM D648 (loading level of 18.6 kg/cm$^2$) |

The results are summarized in Table 1.

TABLE 1

|  | Comp Ex. 1 | Comp Ex. 2 | Comp Ex. 3 | Comp Ex. 4 | Exam. 1 | Exam. 2 | Exam. 3 | Exam. 4 | Exam. 5 | Exam. 6 | Exam. 7 | Exam. 8 |
|---|---|---|---|---|---|---|---|---|---|---|---|---|
| Composition | | | | | | | | | | | | |
| PC 1 (linear PC) | 84.5 | 74.5 | 74.5 | 76.5 | 59.5 | 58.14 | 61.5 | 59.5 | 59.5 | 59.5 | 59.5 | 29.75 |
| PC2 (Branched PC) | | | | 0 | | | | | | | | 29.75 |
| PC-PDMS copolymer | 0 | 0 | 0 | 0 | 15 | 15 | 15 | 15 | 15 | 15 | 15 | 15 |
| Clay | 0 | 10 | 0 | 0 | 10 | 0 | 0 | 10 | 5 | 5 | 5 | 10 |
| Talc | 0 | 0 | 10 | 0 | 0 | 11 | 0 | 0 | 5 | 5 | 0 | 0 |
| Wollastonite | 0 | 0 | 0 | 8 | 0 | 0 | 8 | 0 | 0 | 0 | 5 | 0 |
| ABS 1 (Bulk type) | 8 | 8 | 8 | 8 | 8 | 4.8 | 8 | 8 | 8 | 6.4 | 8 | 8 |
| ABS 2 (Emulsion type) | | | | | 0 | 3.2 | | | | 1.6 | | |
| PTFE | 0.5 | 0.5 | 0.5 | 0.5 | 0.5 | 0.5 | 0.5 | 0.5 | 0.5 | 0.5 | 0.5 | 0.5 |
| BPADP | 7 | 7 | 7 | 7 | 7 | 7 | 7 | 7 | 7 | 7 | 7 | 7 |
| Properties | | | | | | | | | | | | |
| F.M (kg/cm$^2$) | 27500 | 34000 | 40000 | 35000 | 36000 | 35000 | 36000 | 34000 | 36000 | 35000 | 36000 | 35000 |
| Notched IZOD (k-cm/cm) | 45 | 15 | 18 | 15 | 30 | 30 | 30 | 45 | 40 | 40 | 35 | 60 |
| UL94@0.8 mm 5 bar burn time (Sec) | 50 | 65 | 50 | 70 | 35 | 40 | 40 | 45 | 30 | 45 | 40 | 48 |
| UL 94 0.8 mm rating | V1 | V1 | V1 | V1 | V0 | V0 | V0 | V0 | V0 | V0 | V0 | V0 |
| HDT (deg.C) | 107 | 106 | 106 | 106 | 104 | 103 | 104 | 103 | 104 | 103 | 104 | 104 |

What is claimed is:

1. A composition comprising:
   (a) a polycarbonate/siloxane component, said polycarbonate/siloxane component being a polycarbonate siloxane copolymer, or a mixture of a polycarbonate siloxane copolymer and polycarbonate resin;
   (b) a mineral filler selected from the group consisting of clay, talc, wollastonite and combinations thereof; and
   (c) a flame retardant component consisting of a phosphate-based flame retardant;
   wherein the composition comprises at least 50% by weight of polycarbonate taking into account the polycarbonate portion of the polycarbonate siloxane copolymer and any polycarbonate resin and from 1 to 20% of the mineral filler; and wherein the amounts of polycarbonate siloxane copolymer, mineral filler and flame retardant are effective to provide a composition with a UL94 V0 rating at a thickness of 0.8 mm, a notched Izod impact strength or of 25 k-cm/cm or greater and a flexural modulus of 29,000 kg/cm$^2$ or greater.

2. The composition according to claim 1, wherein the siloxane in the polycarbonate/siloxane components is present in an amount of from 0.5 to 6% by weight of the total composition.

3. The composition of claim 2, wherein the siloxane in the polycarbonate siloxane copolymer is polydimethylsiloxane.

4. The composition of claim 2 wherein the siloxane in the polycarbonate/siloxane components is present in an amount of from 1 to 4% by weight of the total composition.

5. The composition of claim 1, wherein the composition further comprises an additional thermoplastic that is not a polycarbonate.

6. The composition of claim 5, wherein the additional thermoplastic is selected from the group consisting of polymers including as structural components aromatic vinyl monomers, polymers including as structural components aromatic vinyl monomers and a vinyl cyanide monomers, polymers including as structural component an aromatic vinyl monomers, a vinyl cyanide monomers and a rubber like polymer; aromatic polyesters, polyphenylene ethers, polyether imides, and polyphenylene sulfides.

7. The composition of claim 6, wherein the additional thermoplastic is an ABS rubber.

8. The composition of claim 7, wherein the siloxane in the polycarbonate siloxane copolymer is polydimethylsiloxane.

9. The composition of claim 7, wherein the siloxane in the polycarbonate/siloxane components is present in an amount of from 0.5 to 6% by weight of the total composition.

10. The composition of claim 1, wherein the composition comprises a polycarbonate resin and therein the polycarbonate resin comprises linear and branched polycarbonates.

11. The composition according to claim 10, wherein the siloxane in the polycarbonate/siloxane components is present in an amount of from 0.5 to 6% by weight of the total composition.

12. The composition of claim 11, wherein the siloxane in the polycarbonate siloxane copolymer is polydimethylsiloxane.

13. The composition of claim 11, wherein the siloxane in the polycarbonate/siloxane components is present in an amount of from 1 to 4% by weight of the total composition.

14. The composition of claim 10, wherein the composition further comprises an additional thermoplastic that is not a polycarbonate.

15. The composition of claim 14, wherein the additional thermoplastic is selected from the group consisting of polymers including as structural components aromatic vinyl monomers, polymers including as structural components aromatic vinyl monomers and a vinyl cyanide monomers, polymers including as structural component an aromatic vinyl monomers, a vinyl cyanide monomers and a rubber like polymer; aromatic polyesters, polyphenylene ethers, polyether imides, and polyphenylene sulfides.

16. The composition of claim 15, wherein the additional thermoplastic is an ABS rubber.

17. The composition of claim 16, wherein the siloxane in the polycarbonate siloxane copolymer is polydirnethylsiloxane.

18. The composition of claim 17, wherein the siloxane in the polycarbonate/siloxane components is present in an amount of from 1 to 4% by weight of the total composition.

19. The composition of claim 1, wherein the phosphate-based flame retardant is present in an amount of from 0.1 to 10% by weight of the total composition.

20. The composition according to claim 19, wherein the siloxane in the polycarbonate/siloxane components is present in an amount of from 0.5 to 6% by weight of the total composition.

21. The composition of claim 20, wherein the siloxane in the polycarbonate siloxane copolymer is polydimethylsiloxane.

22. The composition of claim 20, wherein the siloxane in the polycarbonate/siloxane components is present in an amount of from 1 to 4% by weight of the total composition.

23. The composition of claim 19, wherein the composition further comprises an additional thermoplastic that is not a polycarbonate.

24. The composition of claim 23, wherein the additional thermoplastic is selected from the group consisting of polymers including as structural components aromatic vinyl monomers, polymers including as structural components aromatic vinyl monomers and a vinyl cyanide monomers, polymers including as structural component an aromatic vinyl monomers, a vinyl cyanide monomers and a rubber like polymer, aromatic polyesters, polyphenylene ethers, polyether imides, and polyphenylene sulfides.

25. The composition of claim 24, wherein the additional thermoplastic is an ABS rubber.

26. The composition of claim 25, wherein the siloxane in the polycarbonate siloxane copolymer is polydimethylsiloxane.

27. The composition of claim 25, wherein the siloxane in the polycarbonate/siloxane components is present in an amount of from 0.5 to 6% by weight of the total composition.

28. The composition of claim 19, wherein the composition comprises a polycarbonate resin and therein the polycarbonate resin comprises linear and branched polycarbonates.

29. The composition of claim 1, wherein the composition comprises at least 60by weight of polycarbonate, taking into account the polycarbonate portion of the polycarbonate siloxane copolymer and any polycarbonate resin.

30. The composition of claim 1, wherein the composition comprises at least 65by weight of polycarbonate, taking into account the polycarbonate portion of the polycarbonate siloxane copolymer and any polycarbonate resin.

31. The composition of claim 1, wherein the polycarbonate/siloxane component contains both a polycarbonate siloxane copolymer and a polycarbonate resin.

32. A method for forming an article comprising the steps of:
preparing a composition comprising:
(a) a polycarbonate/siloxane component, said polycarbonate/siloxane component being a polycarbonate siloxane copolymer, or a mixture of a polycarbonate siloxane copolymer and polycarbonate resin:
(b) a mineral filler consisting of a material selected from the group consisting of clay, talc, wollastonite and combinations thereof; and
(c) a flame retardant component consisting of a phosphate-based flame retardant;
wherein the composition composes at least 50% by weight of polycarbonate taking into account the polycarbonate portion of the polycarbonate siloxane copolymer and any polycarbonate resin and from 1 to 20% by weight of the mineral filler, and wherein the amounts of polycarbonate siloxane copolymer, mineral filler and flame retardant are effective to provide a composition with a UL94 V0 rating at a thickness of 0.8 mm, a notched Izod impact strength or of 25 k-cm/cm or greater and a flexural modulus of 29,000 kg/cm$_2$ or greater, and
forming the composition into a thin-walled article by injection molding or extrusion.

33. The method according to claim 32, wherein the siloxane in the polycarbonate/siloxane components is present in an amount of from 0.5 to 6% by weight of the total composition.

34. The method of claim 33, wherein the siloxane in the polycarbonate siloxane copolymer is polydimethylsiloxane.

35. The method of claim 33, wherein the siloxane in the polycarbonate/siloxane components is present in an amount of from 1 to 4% by weight of the total composition.

36. The method of claim 32, wherein the composition further comprises an additional thermoplastic that is not a polycarbonate.

37. The method of claim 36, wherein the additional thermoplastic is selected from the group consisting of polymers including as structural components aromatic vinyl monomers, polymers including as structural components aromatic vinyl monomers and a vinyl cyanide monomers, polymers including as structural component an aromatic vinyl monomers, a vinyl cyanide monomers and a rubber like polymer, aromatic polyesters, polyphenylene ethers, polyether imides, and polyphenylene sulfides.

38. The method of claim 37, wherein the additional thermoplastic is an ABS rubber.

39. The method of claim 38, wherein the siloxane in the polycarbonate siloxane copolymer is polydimethylsiloxane.

40. The method of claim 32, wherein the composition comprises a polycarbonate resin and therein the polycarbonate resin comprises linear and branched polycarbonates.

41. The method according to claim 40, wherein the siloxane in the polycarbonate/siloxane components is present in an amount of from 0.5 to 6% by weight of the total composition; and the mineral filler is present in an amount of from 1 to 20% by weight of the total composition.

42. The method of claim 41, wherein the siloxane in the polycarbonate siloxane copolymer is polydimethylsiloxane.

43. The method of claim 32, wherein the phosphate-based flame retardant is present in an amount of from 0.1 to 10% by weight of the total composition.

44. The method of claim 43, wherein the siloxane in the polycarbonate/siloxane components is present in an amount of from 0.5 to 6% by weight of the total composition; and the mineral filler is present in an amount of from 1 to 20% by weight of the total composition.

45. The method of claim 44, wherein the siloxane in the polycarbonate siloxane copolymer is polydimethylsiloxane.

46. The method of claim 44, wherein the siloxane in the polycarbonate/siloxane components is present in an amount of from 1 to 4% by weight of the total composition.

47. The method of claim 32, wherein the composition further comprises an additional thermoplastic that is not a polycarbonate.

48. The method of claim 47, wherein the additional thermoplastic is selected from the group consisting of polymers including as structural components aromatic vinyl monomers, polymers including as structural components aromatic vinyl monomers and a vinyl cyanide monomers, polymers including as structural component an aromatic vinyl monomers, a vinyl cyanide monomers and a rubber like polymer, aromatic polyesters, polyphenylene ethers, polyether imides, and polyphenylene sulfides.

49. The method of claim 48, wherein the additional thermoplastic is an ABS rubber.

50. The method of claim 49, wherein the siloxane in the polycarbonate siloxane copolymer is polydimethylsiloxane.

51. The method of claim 49, wherein the siloxane in the polycarbonate/siloxane components is present in an amount of from 0.5 to 6% by weight of the total composition.

52. The method of claim 32, wherein the composition comprises a polycarbonate resin and therein the polycarbonate resin comprises linear and branched polycarbonates.

53. A thin walled article formed by the method of claim 32.

54. A thin walled article formed by the method of claim 32, wherein the article is formed by injection molding and has a minimum wall thickness of 1.2 mm.

55. A thin walled article formed by the method of claim 32, wherein the article is formed by extrusion and has a minimum wall thickness of 2 mm.

56. The composition of claim 1, wherein the mineral filler consists of a material selected from the group consisting of clay, talc, wollastonite and combinations thereof.

57. The method of claim 32, wherein the mineral filler consists of a material selected from the group consisting of clay, talc, wollastonite and combinations thereof.

* * * * *

UNITED STATES PATENT AND TRADEMARK OFFICE
CERTIFICATE OF CORRECTION

PATENT NO.        : 7,232,854 B2
APPLICATION NO. : 10/771589
DATED             : June 19, 2007
INVENTOR(S)       : Ma et al.

Page 1 of 1

It is certified that error appears in the above-identified patent and that said Letters Patent is hereby corrected as shown below:

Column 11, Claim 1, Lines 39 and 40 should read: --(b) a mineral filler selected from the group consisting of clay, talc, wollastonite and combinations thereof; and--

Column 13, Claim 29, Line 53 should read: --comprises at least 60% by weight of polycarbonate, taking into--

Column 13, Claim 30, Line 57 should read: --comprises at least 65% by weight of polycarbonate, taking into--

Column 14, Claim 32, Lines 3 through 5 should read: --(b) a mineral filler consisting of a material selected from the group consisting of clay, talc, wollastonite and combinations thereof; and--

Column 16, Claim 56, Line 14 should read: --clay, talc, wollastonite and combinations thereof.--

Column 16, Claim 57, Line 17 should read: --clay, talc, wollastonite and combinations thereof.--

Signed and Sealed this

Thirty-first Day of July, 2007

JON W. DUDAS
*Director of the United States Patent and Trademark Office*